UNITED STATES PATENT OFFICE.

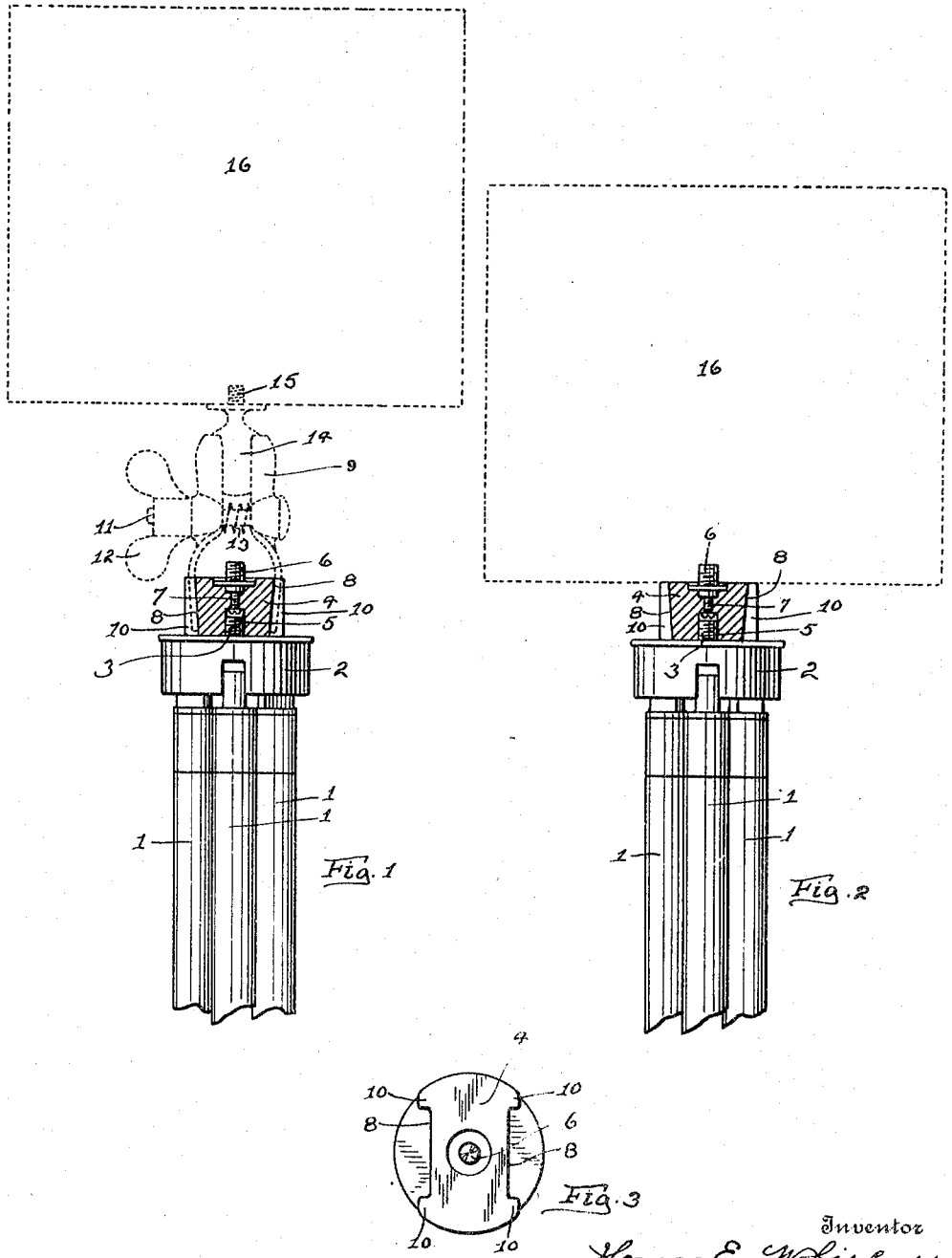

HORACE E. WHITLOCK, OF COLUMBUS, OHIO.

SUPPORTING-BLOCK FOR CAMERAS.

1,325,886.  Specification of Letters Patent.  Patented Dec. 23, 1919.

Application filed March 21, 1917. Serial No. 156,254.

*To all whom it may concern:*

Be it known that I, HORACE E. WHITLOCK, a citizen of the United States, residing at Columbus, in the county of Franklin and State of Ohio, have invented certain new and useful Improvements in Supporting-Blocks for Cameras, of which the following is a specification.

This invention relates to supporting blocks for cameras and is designed for use particularly in connection with tripods now manufactured and offered for sale for this purpose. Oftentimes the photographer finds himself in positions where it is impractical to use a tripod, because of the angularity required of the camera, and for this purpose, clamps of various kinds have been perfected, these clamps being attachable to almost any convenient support. My invention contemplates the provision of a supporting block for use in connection with a tripod, whereby the camera may be either attached directly to the block, or, wherein the supporting clamp may be attached to the block and the camera then supported from it. This latter arrangement permits the camera assuming any desired angularity and at the same time, also permits the use of a tripod. Should it be desired to remove the camera and clamp, this may be readily done without dismantling the tripod itself.

The preferred embodiment of my invention is shown in the accompanying sheet of drawings, in which similar characters of reference designate corresponding parts, and in which:

Figure 1 shows the upper portion of a tripod in side elevation with my improved type of block applied thereto, but shown in cross section, the supporting clamp and camera being shown in dotted outline, Fig. 2 is a view similar to Fig. 1, except that the camera is shown dotted in its applied position directly to the supporting block, and, Fig. 3 is a top plan view of the supporting blocks shown in Figs. 1 and 2.

In the drawings, the tripod is shown as comprising a purality of legs 1 pivotally attached in any desired manner to the tripod head 2. These heads of these tripods are usually provided with an upwardly extending screw 3 onto which the camera is usually secured, the undersides of these cameras being provided with threaded openings for this purpose. It is to this attachment screw 3 that my improved type of block is attached. This block is designated by the reference numeral 4 and, as shown, is provided with a threaded opening 5 in its underside, which opening fits the screw 3. A screw 6 projects upwardly from the upper side of the supporting block and is held in position by means of the screw 7 threaded into the screw 6 from the top of the threaded opening 5, as is shown particularly clearly in Figs. 1 and 2. This screw 6 is of the same type as that shown at 3 and, therefore, forms the ready means of direct attachment to a camera. The block itself is formed to present a pair of faces 8 inclined downwardly toward each other, which forms the means by which the clamp shown dotted at 9, may be attached. The prongs of these clamps are usually inclined slightly as is shown and it is for this reason that the faces 8 are also inclined. The inclination of the faces 8 is such as to prevent a clamp connected therewith from being accidentally displaced by an undue upward movement. The block may be of any desired shape, although I prefer to also form it with the shoulder portions 10 so that the clamp is prevented from tilting as much as is possible. This clamp is formed of the two arms held together by means of the screw 11 and nut 12 operating against the tension of the spring 13. At its upper end, this clamp carries a ball 14 having a screw 15 projecting upwardly therefrom, which screw is also of a form similar to that shown at 3 and thus, it therefore permits the direct application of a camera 16 thereto.

In use, my block is threaded onto the screw 3 usually formed in connection with the head of a tripod. Should it then be desired to mount the camera, so that it will assume various angles, the clamp 9 is applied as shown in Fig. 1 and the camera applied to this clamp as is also shown in dotted outline. Should it not be desired to use the clamp, the camera may be applied directly to the screw 6 carried by the upper side of the block. Thus, it will be apparent that I may mount the camera either by the use of the clamp or not, but without removing the block from the tripod itself. When this block is used, and after it has been once applied, it practically forms a permanent part of the tripod itself, but permits the use of either a clamp or the means for directly applying the camera to the tripod.

What I claim is:

1. The combination with a tripod, of a block removably secured to the head of said tripod, said block being formed on opposite sides with downwardly convergent faces to facilitate the attachment of a camera supporting clamp thereto, and means projecting out of the top of said block to provide means for directly securing a camera to said block.

2. The combination with a tripod and an upward projecting screw in the head of said tripod, of a block having a threaded opening in its lower side for the reception of said screw, said block being formed with diametrically opposed recesses to facilitate the attachment of a camera supporting clamp thereto, and a screw projecting out of the top of the block to provide means for directly securing a camera to said block.

3. The combination with a tripod, of a block removably connected with the head of said tripod, said block being formed on opposite sides with shouldered clamp receiving recesses, the latter having the inner faces thereof inclined downwardly toward each other, and means projecting upwardly from the block to provide means for directly securing a camera to said block.

4. The combination with a tripod, of a camera supporting member carried by the upper end of the tripod, said member having a plurality of opposed clamp receiving recesses formed therein, and said recesses having the inner walls thereof inclined downwardly and inwardly to facilitate the attachment of a camera supporting clamp to said member.

5. The combination with a tripod and an upwardly projecting screw in the head of said tripod, of a block having a threaded opening in its underside to fit said screw, said block being formed on opposite sides with faces to facilitate the clamping attachment of a camera supporting clamp, and a screw projecting out from the top of said block to provide means for directly securing a camera to said block.

In testimony whereof I affix my signature in presence of two witnesses.

HORACE E. WHITLOCK.

Witnesses:
C. C. SHEPHERD,
WALTER E. L. BOCK.